(12) United States Patent
McMillan

(10) Patent No.: US 8,326,592 B2
(45) Date of Patent: Dec. 4, 2012

(54) METHOD AND SYSTEM FOR VERIFYING ELECTRONIC DESIGNS HAVING SOFTWARE COMPONENTS

(75) Inventor: Kenneth L. McMillan, Berkeley, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 586 days.

(21) Appl. No.: 12/340,670

(22) Filed: Dec. 20, 2008

(65) Prior Publication Data

US 2009/0164193 A1 Jun. 25, 2009

Related U.S. Application Data

(60) Provisional application No. 61/016,433, filed on Dec. 21, 2007.

(51) Int. Cl.
*G06F 17/50* (2006.01)
(52) U.S. Cl. ........... 703/14; 716/103; 716/106; 716/111
(58) Field of Classification Search ............... 703/13, 703/14, 22, 27; 716/100, 101, 103, 106, 716/110, 111
See application file for complete search history.

(56) References Cited

U.S. PATENT DOCUMENTS

| | | | | |
|---|---|---|---|---|
| 5,623,418 A * | 4/1997 | Rostoker et al. | ............... | 716/102 |
| 5,838,948 A * | 11/1998 | Bunza | ............................. | 703/27 |
| 5,867,399 A * | 2/1999 | Rostoker et al. | ............... | 716/102 |
| 5,870,588 A * | 2/1999 | Rompaey et al. | ............... | 703/13 |
| 5,880,971 A * | 3/1999 | Dangelo et al. | ............... | 716/105 |
| 6,209,120 B1 * | 3/2001 | Kurshan et al. | ............... | 716/102 |
| 6,324,678 B1 * | 11/2001 | Dangelo et al. | ............... | 716/103 |
| 6,470,482 B1 * | 10/2002 | Rostoker et al. | ............... | 716/102 |
| 6,701,501 B2 * | 3/2004 | Waters et al. | ............... | 716/103 |
| 7,308,672 B2 * | 12/2007 | Waters et al. | ............... | 716/103 |
| 7,735,050 B2 * | 6/2010 | Yu et al. | ............... | 716/104 |
| 7,770,113 B1 * | 8/2010 | Anderson et al. | ............... | 715/272 |
| 2002/0069039 A1 * | 6/2002 | Ricks et al. | ............... | 703/1 |
| 2004/0002845 A1 * | 1/2004 | Akiba et al. | ............... | 703/14 |
| 2005/0049843 A1 * | 3/2005 | Hewitt et al. | ............... | 703/14 |
| 2009/0164968 A1 * | 6/2009 | Kurshan et al. | ............... | 716/18 |

OTHER PUBLICATIONS

Xie et al, F. Translation-Based Co-Verification, Third ACM and IEEE International Conference on Formal Methods and Models for Co-Design, 2005, pp. 111-120.*
Destro et al, P. A Smooth Refinement Flow for Co-designing HW and SW Threads, Design, Automation & Test in Europe Conference, 2007, pp. 1-6.*
Chevalier et al, J. A SystemC Refinement Methodology for Embedded Software, IEEE Design & Test of Computers, Mar.-Apr. 2006, pp. 148-158.*
Viskic et al, I. A Flexible, Syntax Independent Representation (SIR) for System Level Design Models, 9th EUROMICRO Conference on Digital System Design: Architecture, Methods and Tools, 2006, pp. 288-294.*

(Continued)

*Primary Examiner* — Russell Frejd
(74) *Attorney, Agent, or Firm* — Vista IP Law Group, LLP

(57) ABSTRACT

Disclosed is a method and system for providing an improved and flexible approach for handling models of hardware and software designs for verification activities. The semantics of the software and hardware are mapped to allow correct interfacing between the hardware and software models. This allows designers to more efficiently and accurately perform hardware/software co-verification.

31 Claims, 10 Drawing Sheets

OTHER PUBLICATIONS

Xie et al, F. Unified Property Specification for Hardware/Software Co-Verification, 31st Annual International Computer Software and Applications Conference, 2007, pp. 483-490.*

Yang et al, G. Communication and Co-Simulation Infrastructure for Heterogeneous System Integration, Design, Automation and Test in Europe, 2006, pp. 1-6.*

Seneria et al, L. Methodology for Hardware/Software Co-Verification in C/C++, Proceedings of the ASP-Design Automation Conference, 2000, pp. 405-408.*

Chevalie, J., et al., "Space: A Hardware/Software Systemc Modeling Platform Including an RTOS", Languages for System Specification, 2004, pp. 91-104.

Jerraya, A., et al., "Hardware/Software Interface Codesign for Embedded Systems." IEEE Computer Society, Feb. 2005, pp. 63-69.

Xie, F., et al., "Component-based hardware/software co-verification for building trustworthy embedded systems," The Journal of Systems and Software, Sep. 27, 2006, pp. 643-654.

Nakamura, Y., et al., "A Fast Hardware/Software Co-Verification Method for System-On-a-Chip by Using a C/C++ Simulator and FPGA Emulator with Shared Register Communication," DAC 2004, Jun. 7-11, 2004, pp. 299-304.

Hoffmann, A., et al., "A Framework for Fast Hardware-Software Co-simulation," Proceedings of the conference on Design, automation and test in Europe, 2001, pp. 1-5.

Rubini et al., A., "Linux Device Drivers, Chapter 13 mmap and DMA" Jun. 2001, pp. 1-52.

* cited by examiner

METHOD AND SYSTEM FOR VERIFYING ELECTRONIC DESIGNS HAVING SOFTWARE COMPONENTS

CROSS-REFERENCE TO RELATED APPLICATIONS

The present application claims the benefit of U.S. Provisional Application Ser. No. 61/016,433, filed on Dec. 21, 2007, which is hereby incorporated by reference in its entirety.

BACKGROUND

Many phases of modern electronic design are performed with computer aided design (CAD) tools or electronic design automation (EDA) systems. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

Many electronic systems include both hardware components and associated software that run with or on the hardware components. Embedded software is a term that is often used to refer to software components designed to run on specific hardware platforms. Embedded software includes may different types and architectural levels of software within a system design, including examples ranging from low-level microcode instructions for a microprocessor to high-level software that run on specialized electro-mechanical devices (such as automobile components, medical devices, controllers, and consumer devices).

Hardware/software co-design or system-level design refers to the process of concurrently forming designs for the hardware and software components of an electronic system. The process of performing hardware/software co-design is considered very challenging for many designers, since it normally requires a multi-disciplinary approach to systems design that must take into account complex effects throughout the different parts of the system. The design of embedded software and systems is particularly seen as a tricky exercise, often needing to consider many acute constraints for a successful design, such as energy consumption, memory space, criticality and safety considerations, and execution time. With many modern systems designs becoming more and more complex, these constraints are causing greater and greater difficulties or the co-design process.

For example, one area of particular difficulty is the process of performing "verification" upon embedded software or electronic designs having both software and hardware components. Verification is usually performed at several stages of the electronic design process to ensure that the electronic design will work for its intended purpose. After a designer has created an initial set of designs, the designer then tests and optimizes the design using a set of EDA testing and analysis tools. At the logical level, simulation and formal verification are used to test the IC design. At the physical implementation level, common testing and optimization steps include extraction, verification, and compaction.

Conventionally, the process to perform co-verification of a systems level or embedded design is viewed as a very difficult and complicated process. In fact, this task is traditionally so difficult to perform that designers often wait to perform co-verification until after prototype hardware is available, e.g., by using circuit emulators or programmable hardware. One significant problem with this approach is that verification results can only be obtained very late in the design process, after many or all of the low-level design details has been completed. At a late stage of the design process, it would be significantly more onerous and expensive to correct any identified problems as compared to correction of problems at much earlier stages of the design process. Another significant problem is the high cost of producing hardware prototypes. Yet another problem is the long turn-around time that is needed to create and implement physical prototypes.

One possible approach that can be taken to address these problems is to perform simulation or formal verification upon the mixed hardware/software systems design. To perform simulation or formal verification, the simulation/verification tool must be able to access a model of the system being simulated/verified. A co-design finite state machine (CFSM) of a mixed hardware/software design can be used to create models or automata that is then simulated or formally verified.

A significant problem with the conventional CFSMs is that they can only be used to model designs at a very high levels of abstraction. To the extent a conventional CFSM is used to model both hardware and software, there are no effective mechanisms to model the lower-level interactions between the two sets of components, e.g., the effects of the software model upon specific registers within hardware. Since complex interactions cannot be adequately modeled, the conventional CFSM cannot be used to flexibly handle the different abstraction levels of detailed systems verifications, particularly designs at lower levels of design abstractions.

Therefore, there is a need for a method and system that allows effective verification of embedded software and/or co-verification of designs having both hardware and software components.

SUMMARY

Some embodiments of the present invention address the above problems by providing an improved and flexible approach for handling models of hardware and software designs for verification activities. In one embodiment, the semantics of the software and hardware are mapped to allow correct interfacing between the hardware and software models. This allows designers to more efficiently and accurately perform hardware/software co-verification.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

The present invention provides improved approaches for designing and verifying electronic designs.

A fundamental problem with the process to verify embedded software or designs having both software and hardware components (hereinafter collectively referred to as co-verification) is that conventional models cannot adequately handle the full range of interactions that may occur between hardware and software. One may attempt to create a single large model or representation of the entire system of both the hardware and software, but such a single representation would be so large and complex that it would be extremely difficult to generate and unwieldy to use for simulation/verification.

According to some embodiments of the invention, some or all of the hardware components are separately modeled from some or all of the software components in the design. To model the interaction between the hardware and software components, an interface is presented that converts the semantics of one type of model into an event that is recognizable by the semantics of the other model. This approach provides numerous significant advantages over prior approaches. First, the invention provides an effective and flexible approach to handle the full range of interactions that can occur between the hardware and software components in a design. In addition, this approach allows the hardware and software components to be modeled at any suitable level of abstraction while allowing full modeling of the interactions between the hardware and software. Moreover, rather than requiring the creation of a single large model or representation that covers both the hardware and software, separate models can be maintained that address the hardware and software components, greatly facilitating the process of creating/maintaining models.

Embodiments of the invention provide a significant improvement over alternative approaches, such as Ptolemy style modeling or similar tools. Instead of using a process to synthesize the models downward, the present approach allows any type of software model to be used with any type of hardware model, even if the models are at any level of abstraction or granularity. This is because the process framework of the present approach allows for effective and efficient communications between the models, regardless of the type, format, or complexity of the models.

Figure 1:
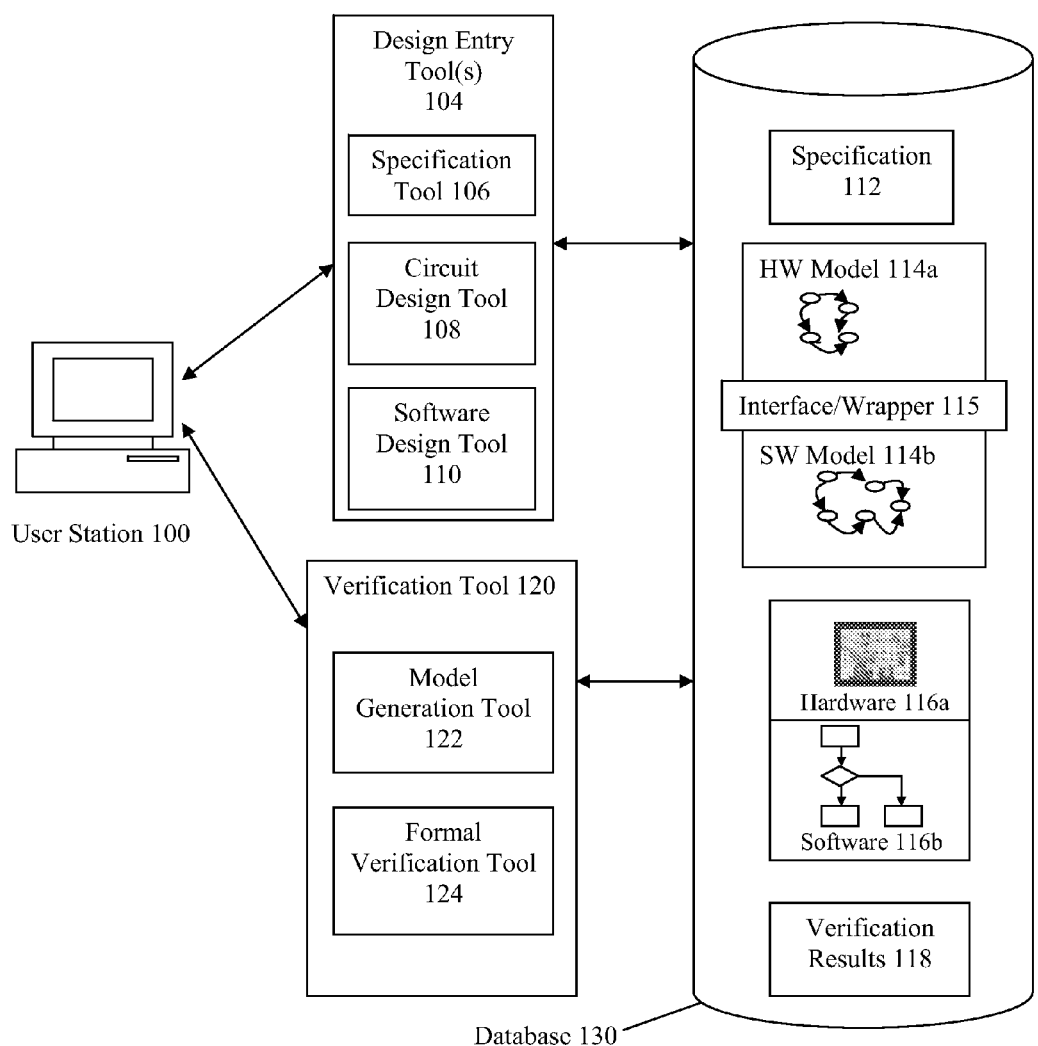
FIG. 1 shows an architecture of a system for performing verification of a design having both hardware and software according to an embodiment of the invention.

FIG. 1 shows an example architecture for performing co-verification according to some embodiments of the invention. One or more design entry tools 104 are used by users at one or more user stations 100 to design, editing, and/or revision of an electronic design. The one or more design entry tools 104 are used to design the hardware and/or software components within the electronic design. One or more specification tools 106 are used to create a specification 112 of the design. Alternatively, the specification 112 may be created using any manual, automated, or mixed manual/automated approach.

One or more circuit design tools 108 are used to create an electrical design 116*a*. Any conventional EDA design entry tool may be used to create the circuit design 116*a*. The Encounter®, Allegro®, and Virtuoso® family of products, available from Cadence Design Systems, Inc. of San Jose, Calif., USA are exemplary examples of tools that may be used to create the electronic design 116*a*. One or more software design tools 110 are used to create a software design 116*b*. Any conventional software design tool 110 may be used to create the software design 116*b* in any suitable software programming language, such as C or SystemC.

One or more verification tools 120 are employed to perform verification functions upon the electronic design 116*a* and 116*b* created and edited by the design entry tool 104. One or more model generation tools 122 are used to create a hardware model 114*a* and a software model 114*b*. The hardware model 114*a* and the software model 114*b* are based upon the design details specified in the specification 112. The verification tool 120 is also used to form an interface/wrapper 115 to handle the interaction between the hardware model 114*a* and the software model 114*b*.

The verification tool 120 verifies the design 116*a* and 116*b* using the models 114*a* and 114*b*. According to one embodiment, formal verification is employed to perform the verification activities. A formal verification tool 124 may be used that generates verification results 118. It is noted that embodiments of the present invention may be employed using other types of verification tools as well. For example, the inventive approach could be used in conjunction with verification activities involving simulation and/or hardware-based verification using devices such as emulators, simulation accelerators, board-based prototyping mechanisms, or virtual machines. Illustrative examples shown in this document may be specifically described in conjunction with formal verification tools and techniques; however, the invention is not to be limited in its scope to formal verification unless claimed as such.

One or more data storage device having one or more databases 130 may be used to store the sets of data produced by the architecture of FIG. 1. Both the design entry tool 104 and the verification tool 120 have access to the data stored within database 130. Users at user station 100 may also have access to some or all of the data stored within database 130.

Figure 2:
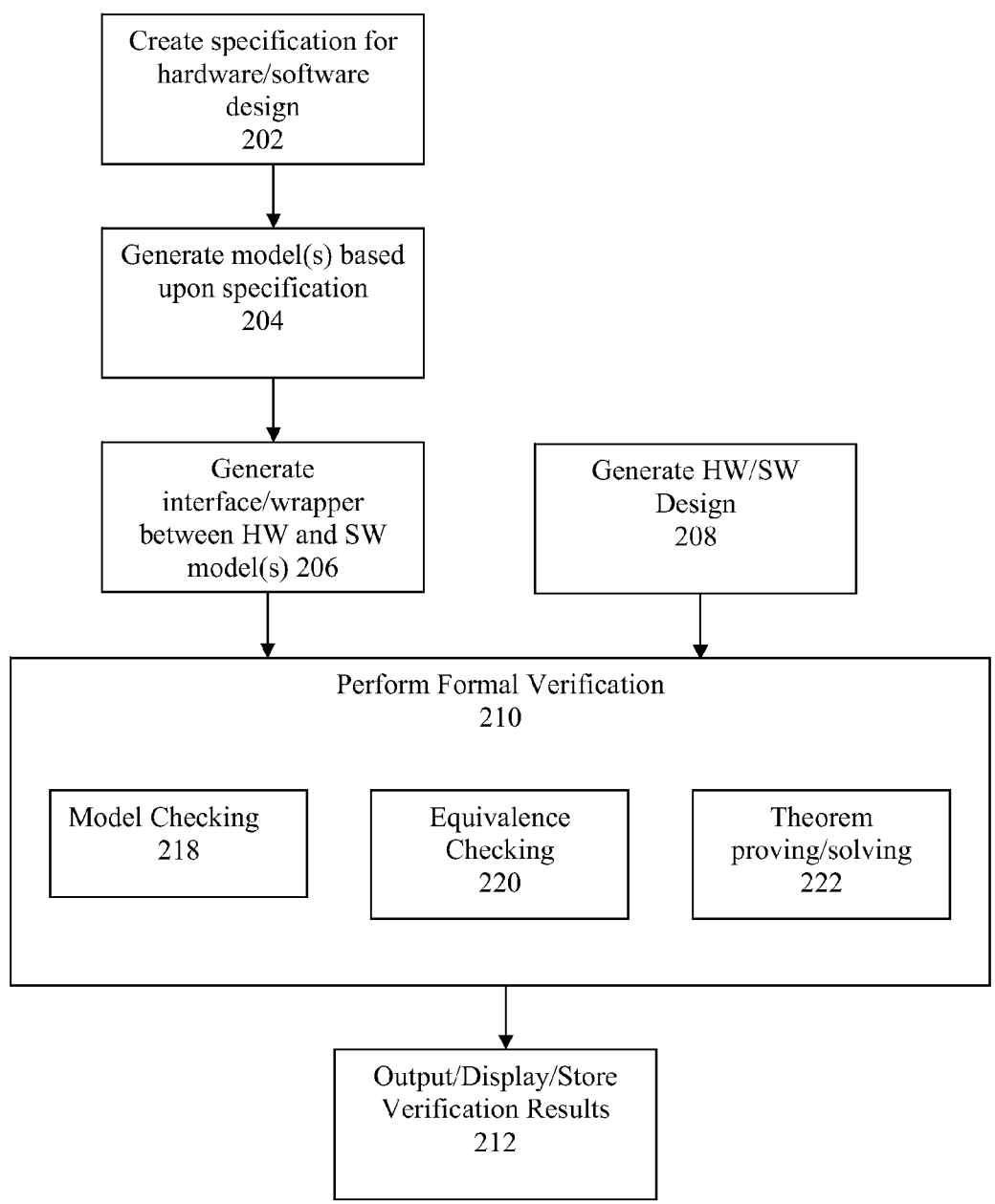
FIG. 2 shows a flowchart of a process for performing co-verification according to an embodiment of the invention.

FIG. 2 shows a flowchart of a process for performing co-verification using the architecture of FIG. 1 according to an embodiment of the invention. At 202, a specification for the hardware/software design of the system is created and/or received from a design creator. The specification defines the functional, behavioral, and/or timing properties of the design. In addition, the specification identifies some of all of the partitioning between the hardware and software components of the system design. The specification may also provide some of the specific lower-level implementation details for the design.

Based upon the specification, a first model for the hardware portion of the design and a second model for the software portion of the design is generated at 204. A model is essentially a symbolic representation of the design or portions of the design. Any conventional modeling technique can be used to create the models. For example, FSMs, CFSMs, or any suitable decision diagrams/equations corresponding to the hardware and software portions can be created, which are then modeled, e.g., using automata interpreted from the FSMs, CFSMs, or decision diagrams/equations.

At 206, interfaces or wrappers are created to address interactions between the hardware and software portions of the models. The interface or wrapper is used to translate the semantics of a first type of model into the semantics understandable by a second type of model.

At 208, a design is generated for the electronic system. The design includes a software design portion and a hardware design portion that both need to be verified to ensure their proper operations and interactions.

Formal verification is performed against the design at 210. In the disclosed embodiment, formal verification is employed to provide a formal proof that properties for the design have been satisfied. Unlike simulation, the formal verification methodology is designed to ensure consistency of coverage for all possible states and inputs. There are numerous approaches that can be taken to perform formal verification. For example, model checking 218 can be used to check that design obeys properties or meets assertions detailed in the specification. In this approach, the models created at 204 are checked against a symbolic representation of the design from 208 to verify whether the state machines corresponding to the actual design conforms to the specification of 202. Equivalence checking 220 can also be used to check the design by comparing the state machines or reachable states associated with the design generated in 208 with the specification generated at 202. For example, BDDs can be used to represents the sets of states corresponding to the design at different stages or states of its processing. Theorem proving/solving 222 is another approach that can be taken to implement formal verification, by performing a formal mathematical proof of the conformance of the design with the specification. At 212, the verification results are displayed to the user or stored in a computer readable storage or memory medium.

Figure 3:
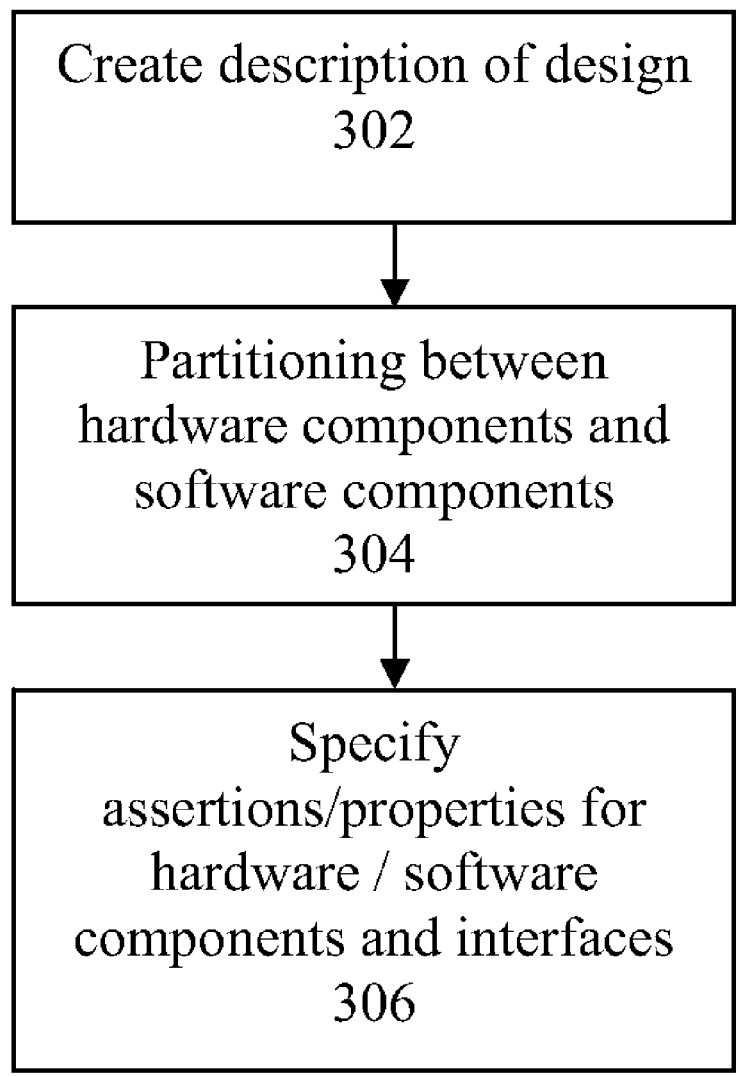
FIG. 3 shows a flowchart of a process for created a specification of a design having both hardware and software components according to an embodiment of the invention.

FIG. 3 illustrates an example approach for implementing a specification according to one embodiment of the invention. This process begins by creating a description of the combined hardware and software design at 302. This action specifies the functional behavior of the system. In addition, this action may be used to specify some low level details of the system design, such as specific hardware implementation details. A key factor to consider is the level of abstraction at which some or all of the specification is to be created. The specific type, abstraction level, and detail level of the system description may vary from one design to another, and is reliant upon the intended purpose to which the invention is directed. Partitioning is performed at 304 to define the hardware portions from the software portions of the design. In some embodiments, some or all of this action can also be taken at the description stage in 302. To support verification activities, at 308, assertions or properties may be specified for the hardware and software portions of the design. The assertion or property to be verified can be a property of a hardware element, a software element, a mixed hardware/software element, or an as-yet undetermined element that could be either a hardware, software, or mixed hardware/software element once further refinement is applied to the design.

Figure 4:
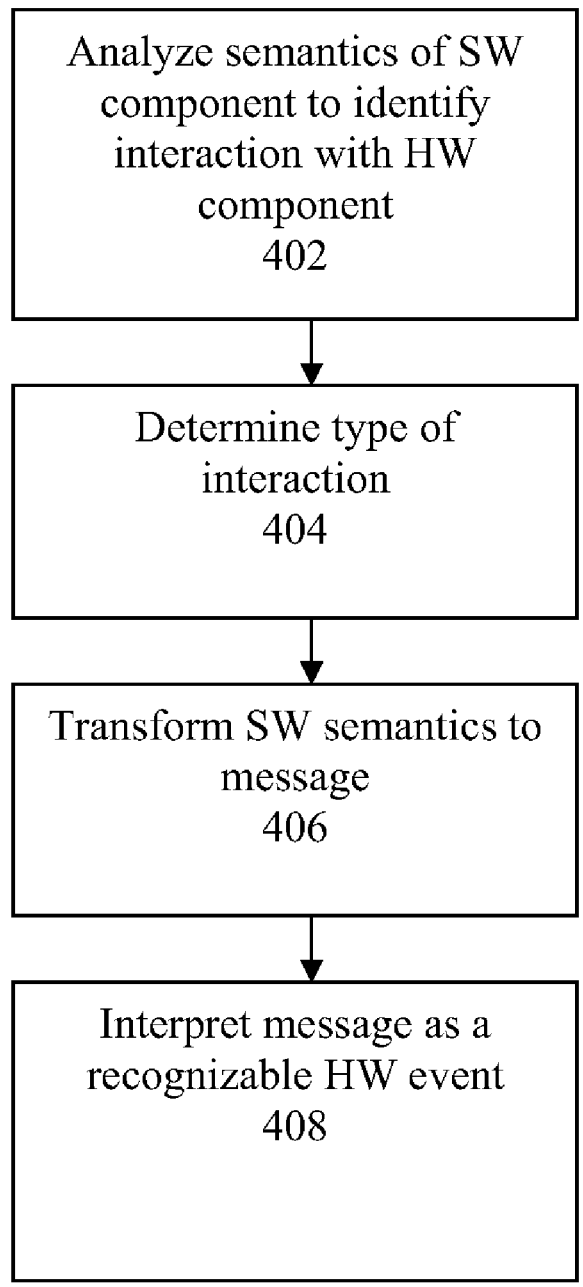
FIG. 4 shows a flowchart of a process for created an interface between a hardware model and a software model according to an embodiment of the invention.

FIG. 4 shows a flowchart of a process for implementing an interface or wrapper between a hardware and software model according to an embodiment of the invention. In a typical system, embedded software "talks" to the hardware portion of the system by performing some type of access or control over that hardware portion. Therefore, to adequately model the system, there must be some way to model that interaction between the embedded software and the hardware components. The problem is that the way one typically models software is by using software-based modeling semantics that are fundamentally different and often incompatible with hardware-based modeling semantics. As previously noted, this can be resolved by creating a single large model of the overall system by using a single set of semantics to model both the hardware and software portions of the system. The problem with this approach is that it creates an overly large and unwieldy model that becomes unusable for typical-sized designs. Another approach is to create both hardware and software models using the same set of semantics. The problem with this approach is its "one-size-fits-all" strategy necessarily requires the models to become too abstract and not able to handle the full range of functionality and design detail that may be needed in the models.

The process of FIG. 4 addresses this problem by permitting a software model to separately co-exist with a hardware model with each using its own set of semantics, but allowing the models able to interact with each other by converting the semantics of one type of model into an event that is recognizable by the semantics of the other model. The specific embodiment of FIG. 4 is directed to the conversion process from the software model to the hardware model. Those of ordinary skill in the art will recognize that a similar process can be used to the conversion process from a hardware model to a software model.

At 402 of the process, the semantics of a software component is analyzed to identify interaction with a hardware component. This action can be taken, for example, by analyzing the software component to identify functionality or call that are made for access or control of a hardware component.

Next, at 404, a determination is made of the type of interaction that is being implemented by the software. At 406, a transformation is performed to translate the semantics of the interaction into a message to be sent to the hardware model. The specific type of interaction identified in 404 is used to generate the specific type of message created in 406. Then, at 408, the message sent to the hardware model to be interpreted as a recognizable event within the semantics of the hardware model. The event would then result in a state or set of states at the hardware.

Essentially, all functional calls or behavior that are recognizable as interacting with hardware are "trapped" and converted from software-based events into messages. The messages are then received by the hardware model and converted back into hardware-based events. For example, a common activity of many types of embedded software is to perform software-based polling or access of hardware-based registers that are mapped into memory address space. Specific function calls are made in the software to allow this type of access. The software specification and/or design can be analyzed to identify all operations that perform these types of memory access. Each of these operations is then converted into appropriate messages to be sent to the hardware models for further conversion into hardware-based events.

Figure 5:
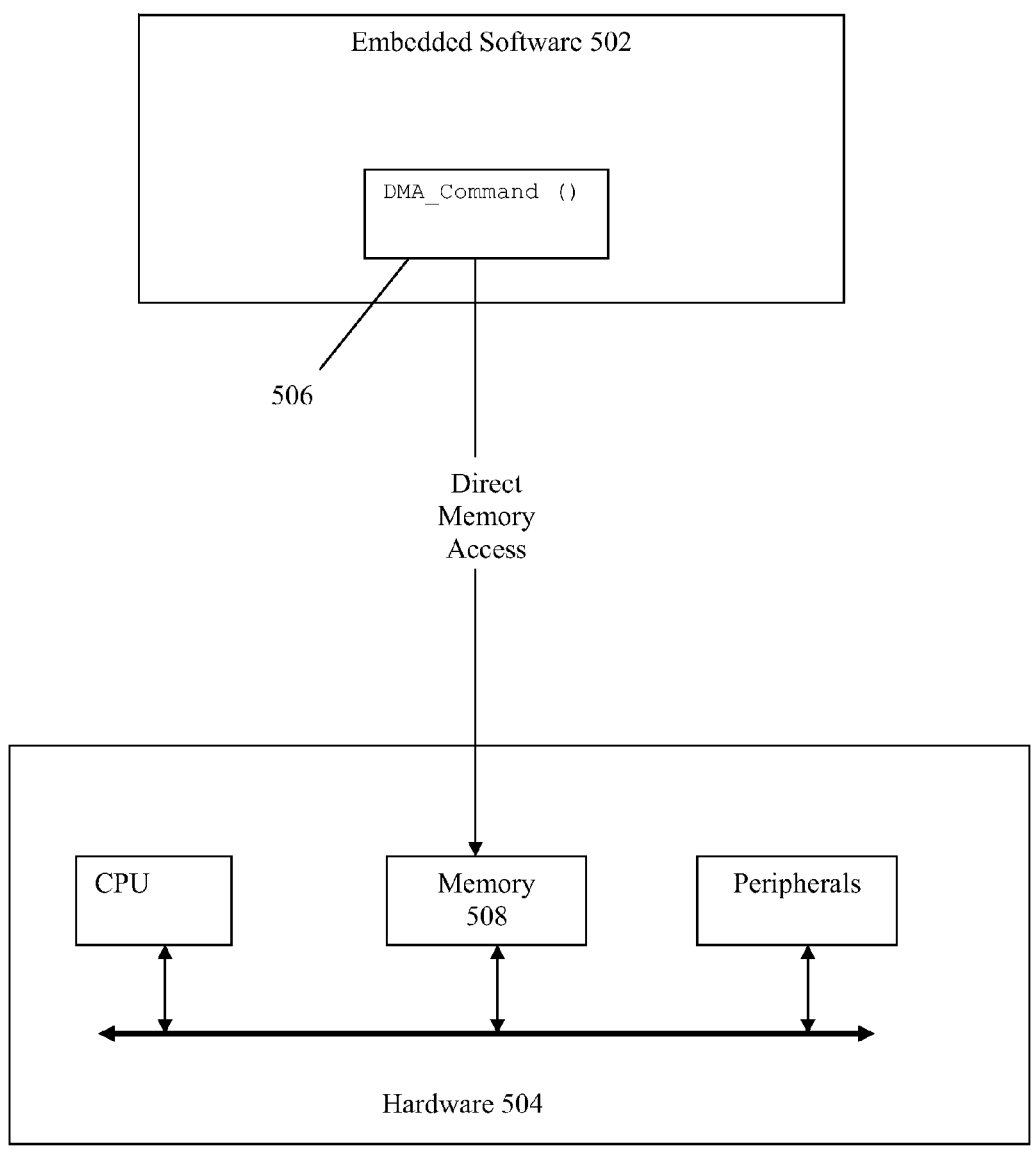
FIG. 5 illustrates an example design portion.

To illustrate this embodiment of the invention, consider the example design portions shown in FIG. 5. This example includes embedded software 502 that includes functionality to perform direct memory access (DMA) upon a memory component 508 within a hardware platform 504. DMA is a low level programming technique that is used to directly access data from a portion of memory. A typical usage of DMA is copying a block of memory from system RAM or specific memory registers to or from a buffer on the device. This is a common activity that many embedded software programs, such as device drivers, must be able to perform. In a typical DMA scenario, the software will give a command to a peripheral device, where peripheral device will then access memory by DMA, and then send an interrupt that will cause a particular software function (e.g., an interrupt handler) to be called. There are at least three interactions in this scenario, including the command (which involves loading memory-mapped hardware registers from software), the DMA (which involves modification of program memory by the hardware), and the interrupt (which changes the software control flow). These three interactions would be modeled on both the hardware and software side.

Figure 6:
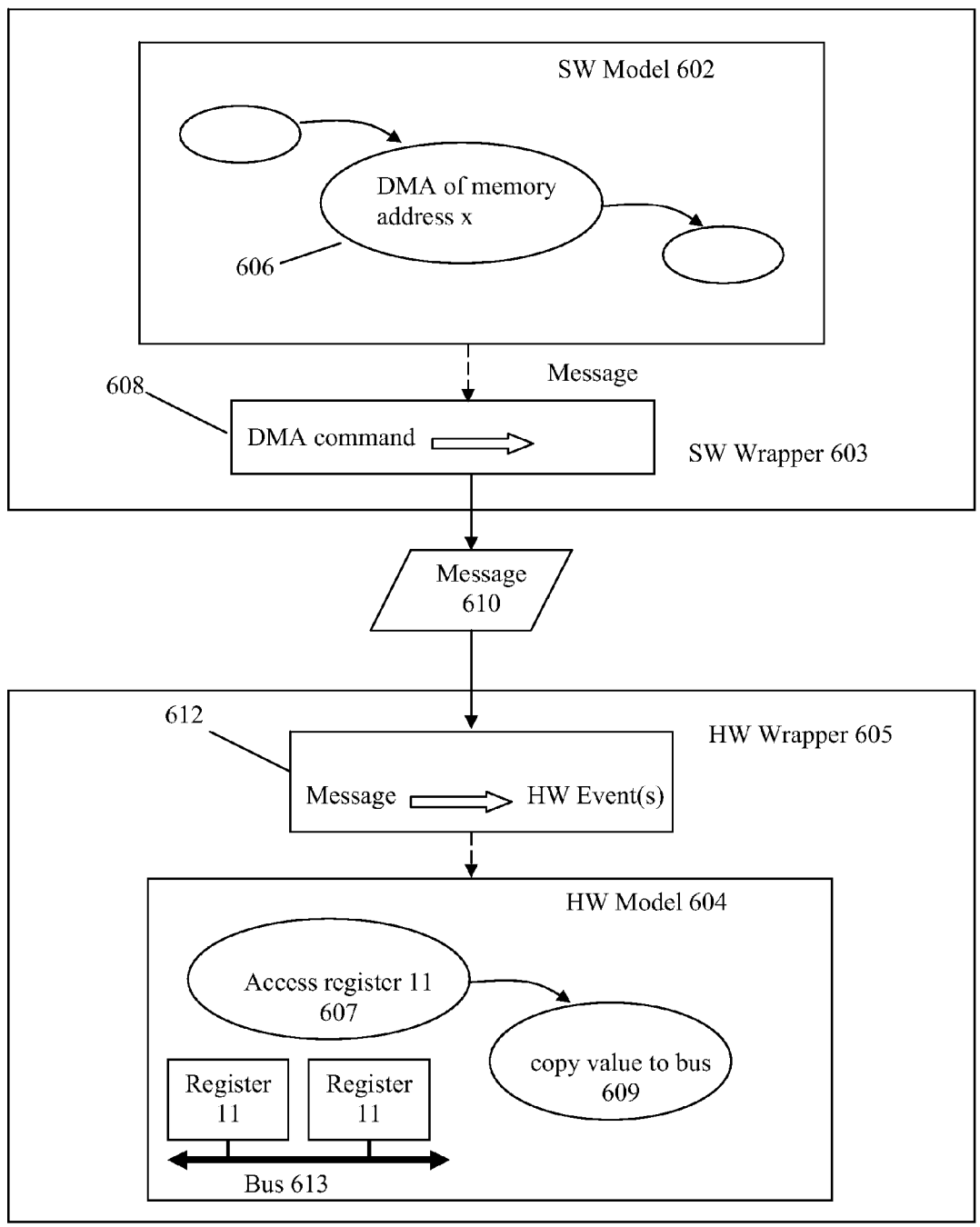
FIG. 6 illustrates an embodiment of an interface between a hardware model and a software model.

To illustrate embodiments of the invention, an example approach for handling the first of these interactions is described with respect to FIG. 6. To verify this DMA operation for a design, a model is created of both the hardware and software portions, e.g., as shown in the model representations of FIG. 6. This figure shows a software model 602 and a hardware model 604. Software model 602 includes a portion 606 in software modeling semantics to perform a DMA operation upon a portion of memory in hardware. Hardware model 604 includes a representation of memory registers 611 and a system bus 613 in hardware semantics. The semantics of the DMA operation at the software and hardware levels are different, since the software model 602 appears to be storing data to memory through a pointer, while the hardware mode 604 sees a sequence of signal values applied to a bus.

To bridge this semantic gap, a wrapper 603 is symbolically constructed around the software model 602. To the extent there are any interactions between the software model 602 and hardware model 604, the wrapper 603 performs the function of transforming software modeling semantics for those interactions into messages to be sent from the software model 602 to the hardware model 604. In the present example, portion 606 of the software model 602 has already been identified as relating to a DMA-type interaction with the hardware model 604. Therefore, the wrapper 603 will be used to transform 608 the semantics of the DMA access from the software model into a message 610.

Another wrapper 605 is symbolically constructed around hardware model 604. To the extent there are any interactions between the software model 602 and hardware model 604, the wrapper 605 performs the function of transforming messages from the software model 602 into events that are recognizable at the hardware model 604. In the present example, a message 610 relating to DMA access 606 by the embedded software represented by software model 602 has been sent from the software model 602 to the hardware model 604. Therefore, the wrapper 605 will be used to transform 612 the message 610 into one or more corresponding hardware events in semantics recognizable by the hardware model 604. In the present example, such events may include, for example, events 607 and 609 to copy a value from a register 11 to a system bus 613.

Figure 7:
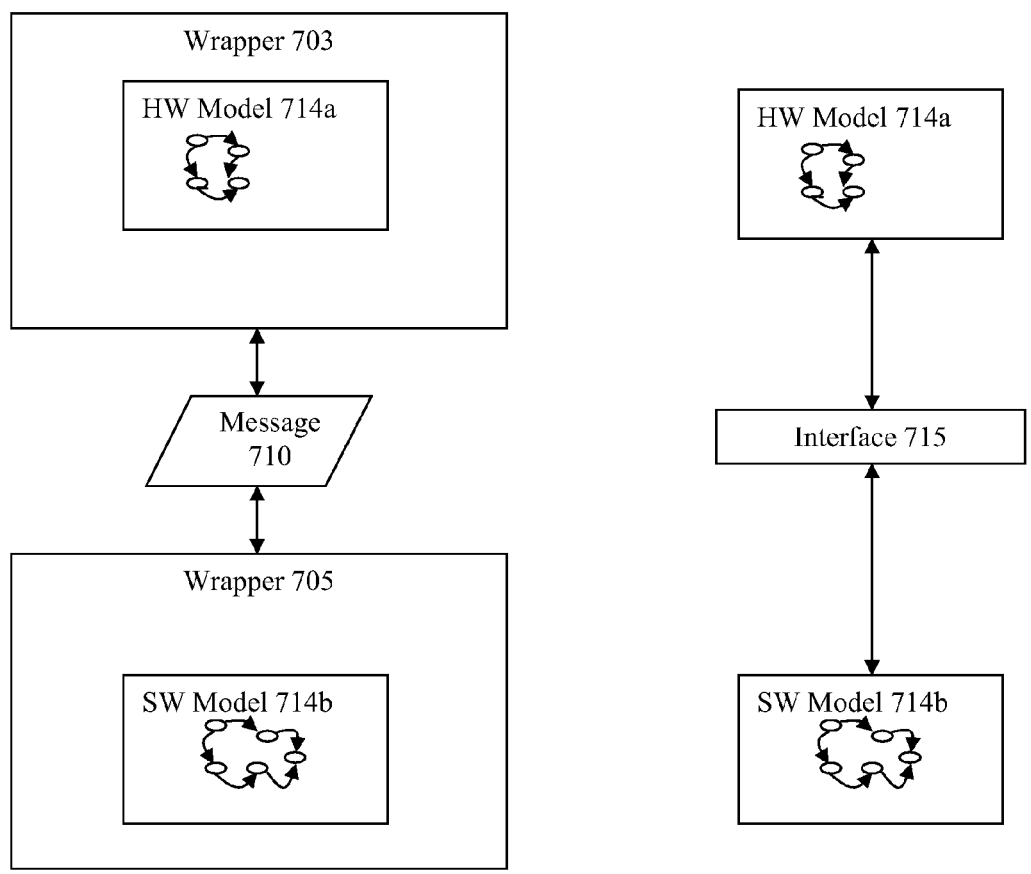
FIG. 7 illustrates two approaches for implementing an interface between a hardware model and a software model.

FIG. 7 shows two alternative approaches for modeling the interaction between a hardware model 714a and a software model 714b. One is the previously described approach of implementing a first wrapper 703 around the hardware model 714a and a second wrapper 705 around the software model 714b. In the outbound direction, the wrappers 703 and 705 are responsible for transforming native modeling semantics into messages to be sent from one model to the other model for interactions between the two models. In the inbound direction, the wrappers 703 and 705 receive the message, and translate the message into one or more events having local semantics that are recognizable at its corresponding model. The second approach is to implement an interface 715 that encapsulates the functions of wrappers 703 and 705, by directly translating the semantics of a first model into the semantics of a second model.

Figure 8A:
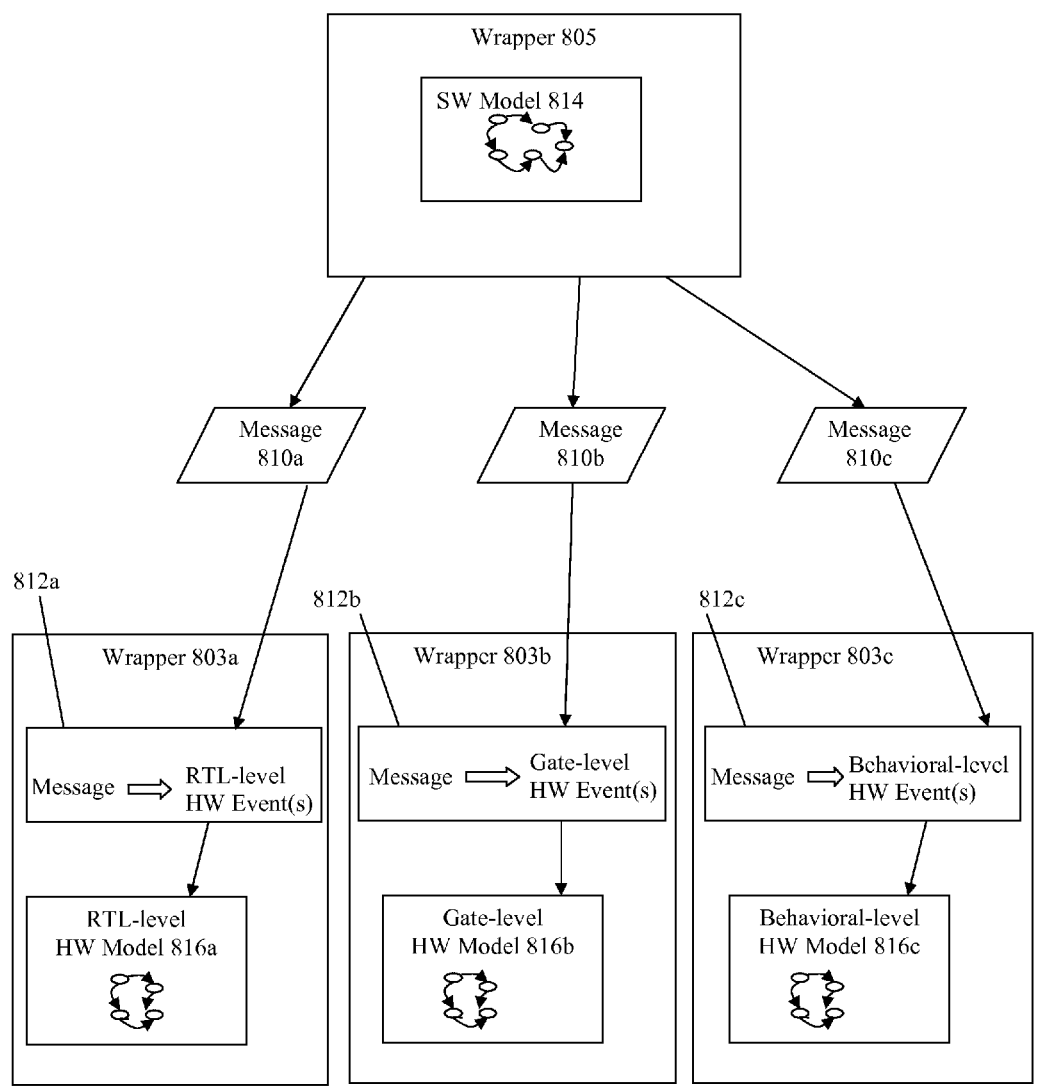
FIGS. 8A and 8B illustrate interfacing between models at different abstraction levels according to embodiments of the invention.

Embodiments of the invention are flexible enough to handle any level of abstraction for the interaction between models, including models having multiple levels of abstraction. This is illustrated in the example of FIG. 8A. This figure shows three hardware models 816a, 816b, and 816c. Hardware model 816a is an RTL-level model of the hardware design (or just a portion of the hardware design). Hardware model 816b is a gate-level model of the hardware design (or a portion of the hardware design). Hardware model 816c is a behavioral model of the hardware design (or a portion of the hardware design). In one embodiment, these models represent three entirely separate models at different abstraction levels. In an alternate embodiment, this represents three portions of the same model at different levels of abstraction.

Any of the models 816a, 616b, and/or 816c may need to interact with a software model 814 in order to perform verification. To handle the interactions, a wrapper 805 is associated with software model 814. This wrapper 805 transforms software-related modeling semantics into messages 810a, 810b, and/or 810c to be sent from the software model 814 to the hardware models 816a, 816b, and 816c.

For messages 810a to RTL-level model 816a, wrapper 805 generates message 810a specific for RTL-level functionality or behavior. For example, the message could specify a request to access to particular memory registers. Message 810a would then be transformed 812a by wrapper 803a into one or more events having semantics that are recognizable by a RTL-level model 816a. For example, the message could be translated into events to copy from specific registers into a buffer.

For messages 810b to gate-level model 816b, wrapper 805 generates message 810b specific for gate-level functionality or behavior. For example, the message could specify a general request to access memory represented with gate-level circuit structures. Message 810b would then be transformed 812b by wrapper 803b into one or more events having semantics that are recognizable by a gate-level model 816b. For example, the message could be translated into hardware-based events to generally copy a value from memory.

For messages 810c to behavioral-level model 816c, wrapper 805 generates message 810c specific for behavioral-level functionality or behavior of the hardware design. For example, the message could specify a general request to functionally access memory. Message 810c would then be transformed 812c by wrapper 803c into one or more events having semantics that are recognizable by a behavioral-level model 816c.

Figure 8B:
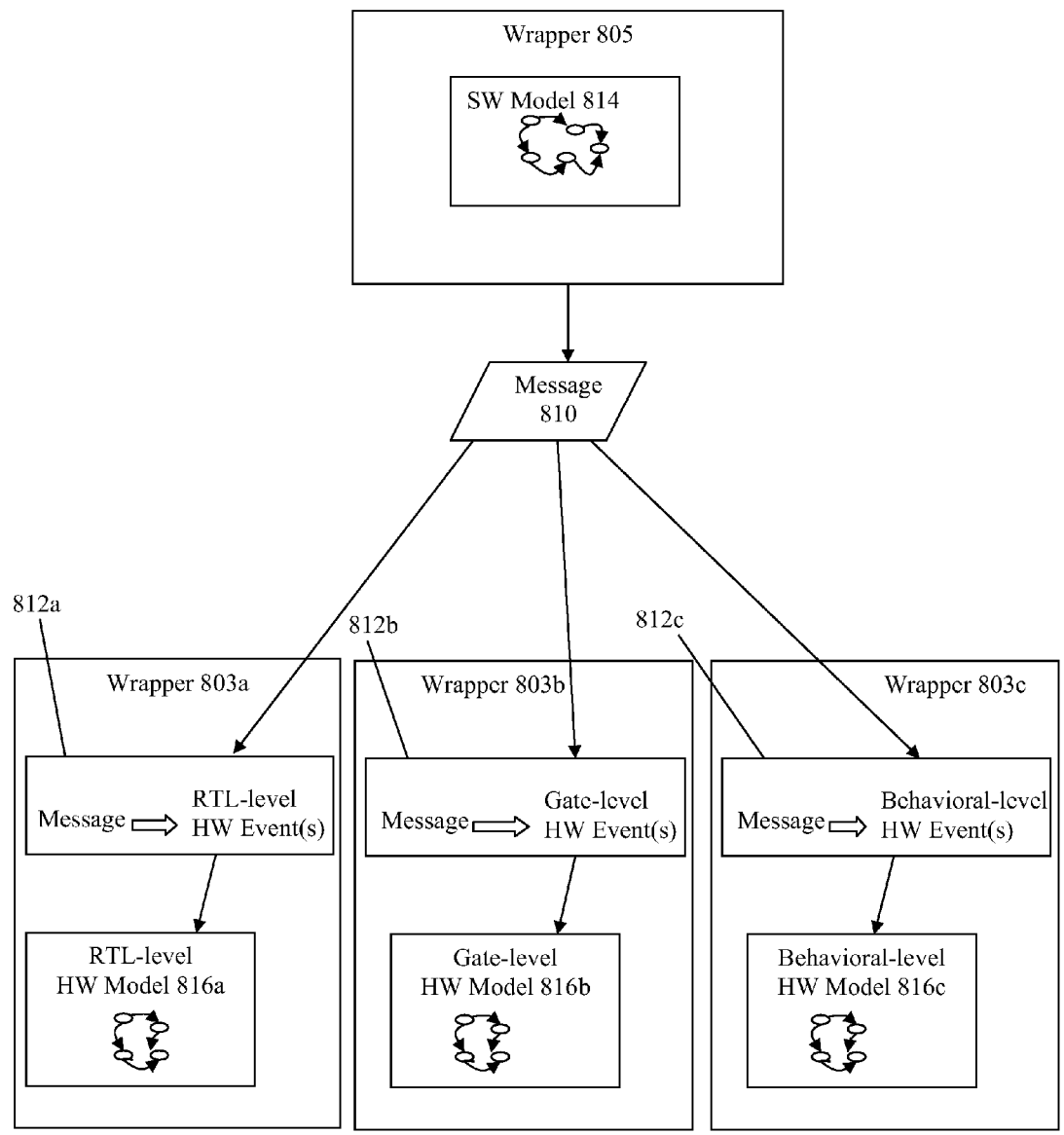

FIG. 8B shows an alternate approach in which wrapper 805 associated with software model 814 generate a generic message 810. Generic message 810 is capable of being used with a hardware model at multiple hardware abstraction levels. The wrapper would include the capability and programmed intelligence to interface with generic messages, and to translate the generic message into events that are appropriate for the specific level of abstraction for the design. In this example, wrapper 803a is invested with enough intelligence to translate generic message 810 into one or more events having semantics that are recognizable by a RTL-level model 816a. Similarly, wrapper 803b is invested with enough intelligence to translate generic message 810 into one or more events having semantics that are recognizable by a gate-level model 816b. Likewise, wrapper 803c is invested with enough intelligence to translate generic message 810 into one or more events having semantics that are recognizable by a behavioral-level model 816c.

These examples highlight a particularly advantage of the present approach, in which the invention is capable of interfacing any model with any other model, regardless of the level of abstraction that is used to implement some or all of the models. A designer is therefore not constrained in his ability to design models and specifications at different level of abstraction. Instead, the designer can specify models at any level of abstraction that is desirable or suitable for his particular design needs. This provides the designer with great flexibility to perform design activities while still permitting co-verification to take place.

While the above embodiments have been described relative to formal verification, it is noted that the inventive interface approach to working with mixed hardware and software models could be applied to other verification methodologies as well. For example, the modeling approach of the present invention can also be applied to facilitate simulation of designs having both hardware and software components. In this approach, the execution of the software may be performed using a variety of systems, including direct execution on the simulation host, execution on a virtual machine, in an instruction set simulation, or on a development board.

System Architecture Overview

Figure 9:
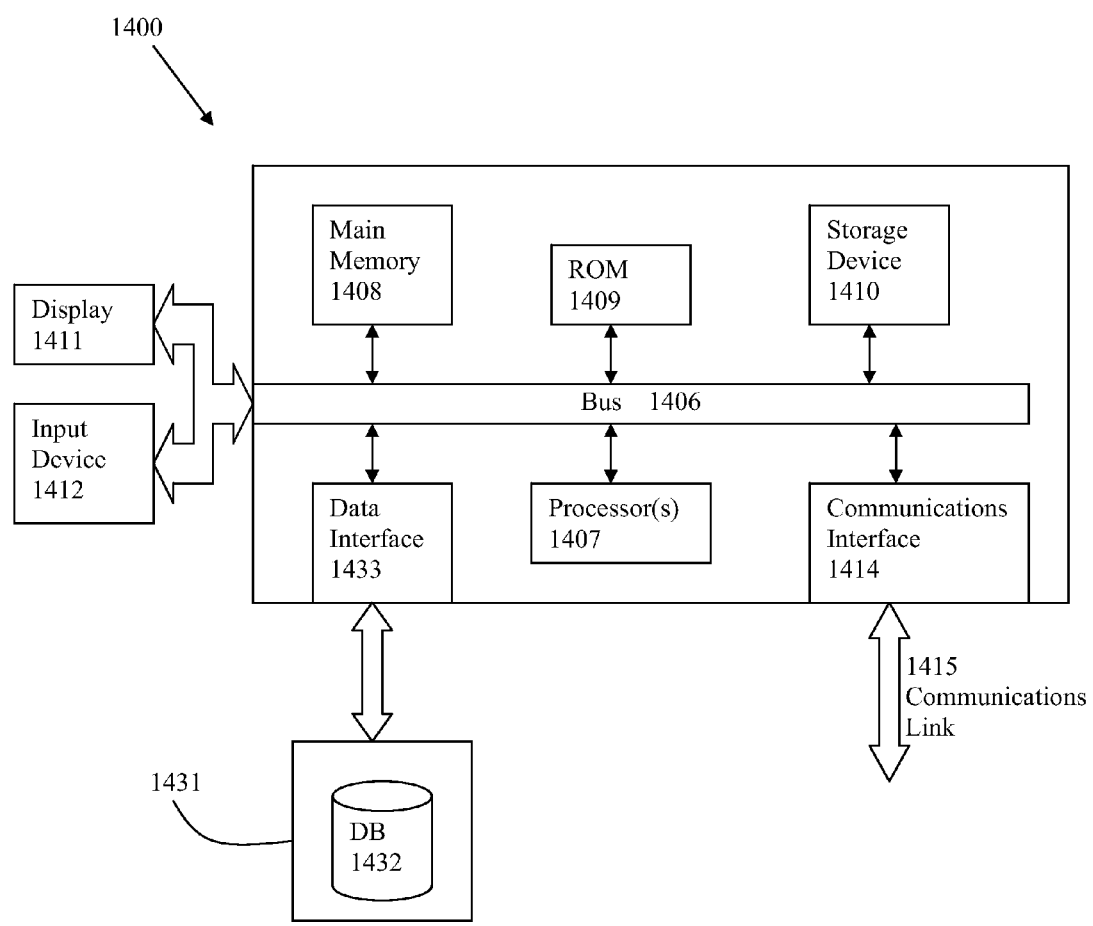
FIG. 9 shows an architecture of an example computing system with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer-implemented method for implementing a design having both a hardware portion and a software portion, comprising:
   using at least one processor to perform a process, the process comprising:
   receiving a specification for the design;
   generating one or more models at multiple levels of abstraction for the hardware portion and at least one model for the software portion by modeling at least one interaction between the hardware portion and the software portion on both the at least one model for the software portion and at least one model in the one or more models at the multiple levels of abstraction for the hardware portion;
   generating an interface between the software portion and the hardware portion to handle interactions between the software portion and the multiple levels for the hardware portion, wherein the interface converts semantics between the software portion and the hardware portion; and
   verifying the design using the one or more models by using the interface.

2. The method of claim 1 in which the one or more models comprises a model for the hardware portion that is separate from a model for the software portion.

3. The method of claim 1 in which the one or more models comprises a FSM, CFSM, or a decision diagram.

4. The method of claim 1 in which formal verification is performed to verify the design, wherein the formal verification comprises model checking, equivalence checking, or theorem proving.

5. The method of claim 1 in which the specification is generated by:
   creating a description of the design;
   partitioning between the software portion and the hardware portion; and
   specifying properties to be verified for the software portion and the hardware portion.

6. The method of claim 1 in which the interface is generated by:
   analyzing the semantics to identify possible interactions between the software portion and the hardware portion;
   determining types of the possible interactions between the software portion and the hardware portion;
   converting the semantics from one model to the other model between the software portion and the hardware portion; and
   interpreting a communication using the semantics from one model to the other model between the software portion and the hardware portion.

7. The method of claim 6 in which the semantics are analyzed by identifying functionality or calls that are made to control another component.

8. The method of claim 6 in which the semantics are converted from the software portion to the hardware portion by sending a message to a hardware model that is interpreted as an event within the semantics of the hardware model.

9. The method of claim 1 in which the interface comprises a wrapper.

10. The method of claim 1 in which at least one of the software portion or the hardware portion is at multiple levels of abstraction.

11. The method of claim 10 in which the multiple levels of abstraction comprises RTL-level, gate-level, or behavioral level abstraction.

12. A computer program product that includes a non-transitory computer readable storage medium, the non-transitory computer readable storage medium comprising a plurality of computer instructions which, when executed by at least one processor, cause the at least one processor to execute performing a method for implementing a design having both a hardware portion and a software portion, the method comprising:
using the at least one processor to perform a process, the process comprising:
receiving a specification for the design;
generating one or more models at multiple levels of abstraction for the hardware portion and the software portion by modeling at least one interaction between the hardware portion and the software portion on both the at least one model for the software portion and at least one model in the one or more models at the multiple levels of abstraction for the hardware portion;
generating an interface between the software portion and the hardware portion to handle interactions between the software portion and the multiple levels for the hardware portion, wherein the interface converts semantics between the software portion and the hardware portion; and
verifying the design using the one or more models by using the interface.

13. The computer program product of claim 12 in which the one or more models comprises a model for the hardware portion that is a separate from a model for the software portion.

14. The computer program product of claim 12 in which the one or more models comprises a FSM, CFSM, or a decision diagram.

15. The computer program product of claim 12 in which formal verification is performed to verify the design, wherein the formal verification comprises model checking, equivalence checking, or theorem proving.

16. The computer program product of claim 12 in which the specification is generated by:
creating a description of the design;
partitioning between the software portion and the hardware portion; and
specifying properties to be verified for the software portion and the hardware portion.

17. The computer program product of claim 12 in which the interface is generated by:
analyzing the semantics to identify possible interactions between the software portion and the hardware portion;
determining types of the possible interactions between the software portion and the hardware portion;
converting the semantics from one model to the other model between the software portion and the hardware portion; and
interpreting a communication using the semantics from one model to the other model between the software portion and the hardware portion.

18. The computer program product of claim 17 in which the semantics are analyzed by identifying functionality or calls that are made to control another component.

19. The computer program product of claim 17 in which the semantics are converted from the software portion to the hardware portion by sending a message to a hardware model that is interpreted as an event within the semantics of the hardware model.

20. The computer program product of claim 12 in which the interface comprises a wrapper.

21. The computer program product of claim 12 in which at least one of the software portion or the hardware portion is at multiple levels of abstraction.

22. The computer program product of claim 21 in which the multiple levels of abstraction comprises RTL-level, gate-level, or behavioral level abstraction.

23. A system for implementing a design, comprising:
one or more processors that is to process computer program code to
receive a specification for the design; and
generate one or more models at multiple levels of abstraction for the hardware portion and at least one model for the software portion by modeling at least one interaction between the hardware portion and the software portion on both the at least one model for the software portion and at least one model in the one or more models at the multiple levels of abstraction for the hardware portion, where an interface is generated between the software portion and the hardware portion to handle interactions between the software portion and the multiple levels for the hardware portion, wherein
the interface converts semantics between the software portion and the hardware portion, the one or more processors executing program code to verify the design using the one or more models by using the interface.

24. The system of claim 23 in which the one or more models comprises a model for the hardware portion that is a separate from a model for the software portion.

25. The system of claim 23 in which the one or more models comprises a FSM, CFSM, or a decision diagram.

26. The system of claim 23 in which formal verification is performed to verify the design, wherein the formal verification comprises model checking, equivalence checking, or theorem proving.

27. The system of claim 23 in which the specification is generated by creating a description of the design, partitioning between the software portion and the hardware portion, and specifying properties to be verified for the software portion and the hardware portion.

28. The system of claim 23 in which the interface is generated by analyzing the semantics to identify possible interactions between the software portion and the hardware portion, determining types of the possible interactions between the software portion and the hardware portion, converting the semantics from one model to the other model between the software portion and the hardware portion, and interpreting a communication using the semantics from one model to the other model between the software portion and the hardware portion.

29. The system of claim 28 in which the semantics are converted from the software portion to the hardware portion by sending a message to a hardware model that is interpreted as an event within the semantics of the hardware model.

30. The system of claim 23 in which the interface comprises a wrapper.

31. The system of claim 23 in which at least one of the software portion or the hardware portion is at multiple levels of abstraction.

* * * * *

UNITED STATES PATENT AND TRADEMARK OFFICE
CERTIFICATE OF CORRECTION

| | |
|---|---|
| PATENT NO. | : 8,326,592 B2 |
| APPLICATION NO. | : 12/340670 |
| DATED | : December 4, 2012 |
| INVENTOR(S) | : McMillan |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this
Eleventh Day of November, 2014

Michelle K. Lee
*Deputy Director of the United States Patent and Trademark Office*